(12) United States Patent
Manolakos et al.

(10) Patent No.: US 10,374,765 B2
(45) Date of Patent: Aug. 6, 2019

(54) QUANTIZED K-RESOURCE ELEMENT ROW-COLUMN INTERLEAVER

(71) Applicant: QUALCOMM Incorporated, San Diego, CA (US)

(72) Inventors: Alexandros Manolakos, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/842,137

(22) Filed: Dec. 14, 2017

(65) Prior Publication Data

US 2018/0175981 A1    Jun. 21, 2018

Related U.S. Application Data

(60) Provisional application No. 62/463,489, filed on Feb. 24, 2017, provisional application No. 62/434,956, filed on Dec. 15, 2016.

(51) Int. Cl.
*H04L 5/00* (2006.01)
*H04L 1/00* (2006.01)
(Continued)

(52) U.S. Cl.
CPC .......... *H04L 5/0046* (2013.01); *H04L 1/0057* (2013.01); *H04L 1/0067* (2013.01);
(Continued)

(58) Field of Classification Search
CPC ... H04L 1/0071; H04L 1/0067; H04L 5/0007; H04L 1/0057; H04L 5/0046; H04L 27/2601; H04B 1/02
See application file for complete search history.

(56) References Cited

U.S. PATENT DOCUMENTS

| 7,885,230 B2 * | 2/2011 | Seo ........................ H04L 1/0071 370/329 |
| 8,225,186 B2 * | 7/2012 | Jin ........................ H04B 7/0874 714/755 |

(Continued)

FOREIGN PATENT DOCUMENTS

| EP | 2728756 A1 | 5/2014 | |
| WO | WO-2008024173 A2 * | 2/2008 | .......... H04J 11/0073 |

OTHER PUBLICATIONS

International Search Report and Written Opinion—PCT/US2017/066577—ISA/EPO—dated Apr. 6, 2018.

(Continued)

*Primary Examiner* — Mounir Moutaouakil
(74) *Attorney, Agent, or Firm* — Patterson & Sheridan, LLP

(57) ABSTRACT

Certain aspects of the present disclosure provide a method for wireless communications in a wireless network via a radio access technology. The method generally includes determining dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element, performing the interleaving of the modulated symbols, according to the matrix having the determined dimensions, and transmitting the interleaved modulated symbols in the wireless network via the radio access technology. Other aspects, embodiments, and features are also described and claimed.

26 Claims, 13 Drawing Sheets

0, 0, 0, 0, 0, 1, 1, 1, 1, 1, 2, 2, 2, 2, 2

0, 1, 2, 0, 1, 2, 0, 1, 2, 0, 1, 2, 0, 1, 2

Minimum distance is 3
between k-tone bundles
of the same CB

(51) Int. Cl.
*H04L 1/04* (2006.01)
*H04L 27/26* (2006.01)
*H04B 1/02* (2006.01)

(52) U.S. Cl.
CPC .............. *H04L 1/0071* (2013.01); *H04L 1/04* (2013.01); *H04L 5/0007* (2013.01); *H04L 27/2626* (2013.01); *H04L 27/2647* (2013.01); *H04B 1/02* (2013.01); *H04L 5/0023* (2013.01); *H04L 5/0044* (2013.01); *H04L 27/2601* (2013.01)

(56) References Cited

U.S. PATENT DOCUMENTS

| | | | | |
|---|---|---|---|---|
| 2008/0031374 | A1* | 2/2008 | Walton | H04B 7/043 |
| | | | | 375/267 |
| 2008/0095282 | A1* | 4/2008 | Walton | H04B 7/0417 |
| | | | | 375/347 |
| 2012/0163310 | A1* | 6/2012 | Baek | H04L 5/0007 |
| | | | | 370/329 |
| 2012/0163350 | A1* | 6/2012 | Seo | H04L 1/0071 |
| | | | | 370/336 |
| 2013/0156124 | A1* | 6/2013 | Wang | H04L 1/0071 |
| | | | | 375/267 |
| 2014/0136922 | A1* | 5/2014 | Oketani | H03M 13/2707 |
| | | | | 714/762 |
| 2015/0263765 | A1* | 9/2015 | Zhang | H03M 13/276 |
| | | | | 714/762 |
| 2015/0304070 | A1 | 10/2015 | Baek et al. | |
| 2017/0019288 | A1* | 1/2017 | Sagong | H04L 27/34 |
| 2018/0083736 | A1* | 3/2018 | Manolakos | H04L 1/0071 |

OTHER PUBLICATIONS

Lenovo et al: "On Codeword to RE Mapping Scheme," 3GPP Draft; R1-1712670_CW_Mapping, 3rd Generationpartnership Project (3GPP), Mobile Competence Centre; 650, Route Des Lucioles; F-06921 Sophia-Antipolis Cedex; France vol. RAN WG1, No. Prague, Czech; 20170821-20170825; XP051315483, Aug. 20, 2017 (Aug. 20, 2017), 11 pages, Retrieved from the Internet: URL: http://www.3gpp.org/ftp/Meetings_3GPPSYNC/RAN1/Docs/ [retrieved on Aug. 20, 2017].

Qualcomm Incorporated: "Frequency Domain Interleaving," 3GPP Draft; R1-1708641_Frequency_Domain_Interleaving, 3rd Generation Partnership Project (3GPP), Mobile Competence Centre; 650, Route Des Lucioles; F-06921 Sophia-Antipolis Cedex; France vol. RAN WG1, No. Hangzhou, China; 20170515-20170519; XP051273828, May 14, 2017 (May 14, 2017), pp. 1-9, Retrieved from the Internet: URL: http://www.3gpp.org/ftp/Meetings_3GPPSYNC/RAN1/Docs/ [retrieved on May 14, 2017].

* cited by examiner $k = 4$
$N_{k-REs\,per\,CB} = 2$ (i.e., $N_{rows}$)
$N_{k-REs} = 6$
$N_{Columns} = 3$ Minimum distance is 2 between k-tone bundles of the same CB

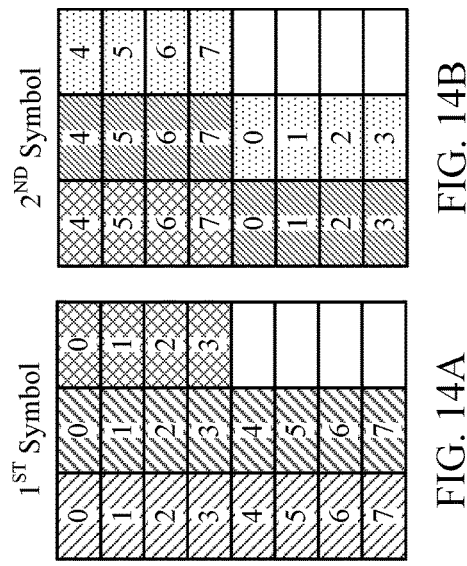
FIG. 14A
FIG. 14B
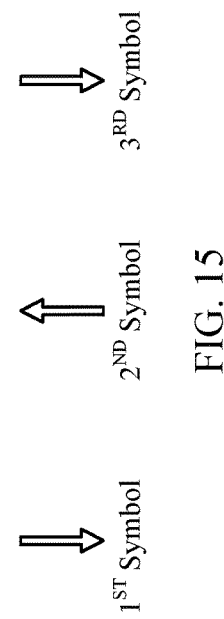
FIG. 15
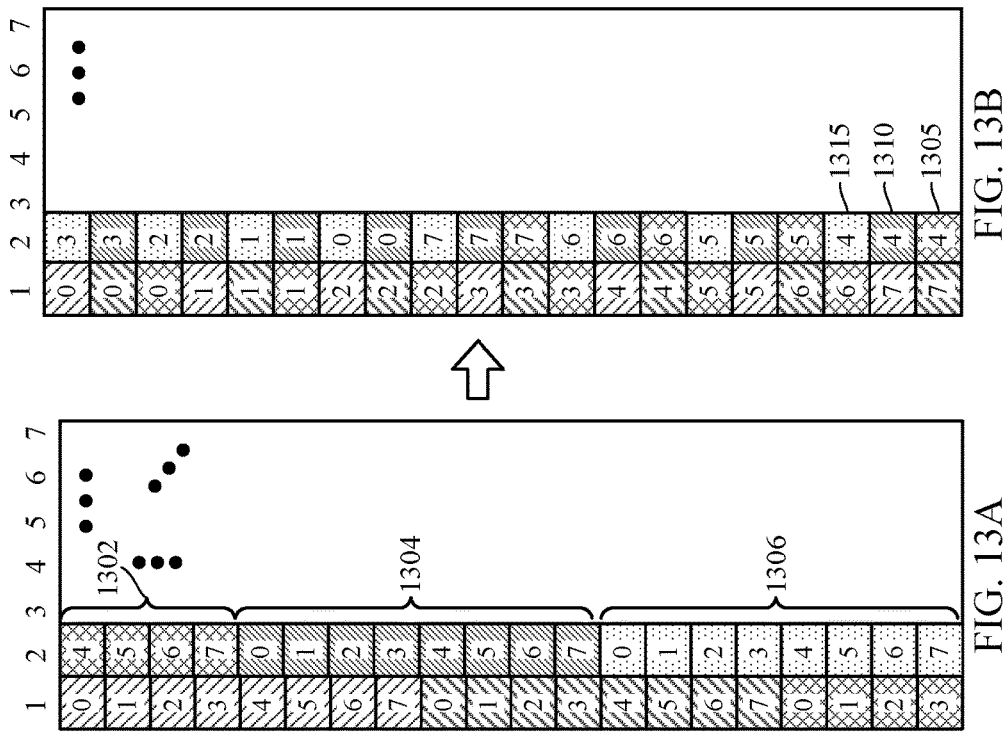
FIG. 13A
FIG. 13B

QUANTIZED K-RESOURCE ELEMENT ROW-COLUMN INTERLEAVER

CLAIM OF PRIORITY UNDER 35 U.S.C. § 119

This application claims benefit of U.S. Provisional Patent Application Ser. Nos. 62/434,956 and 62/463,489, filed Dec. 15, 2016 and Feb. 24, 2017, respectively, which are herein incorporated by reference in their entirety.

FIELD OF THE DISCLOSURE

The present disclosure relates generally to communication systems, and more particularly, to a quantized k-resource element row-column interleaver.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to a quantized k-resource element row-column interleaver.

Certain aspects of the present disclosure provide a method for wireless communications in a wireless network via a radio access technology. The method generally includes determining dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element, performing the interleaving of the modulated symbols according to the matrix having the determined dimensions, and transmitting the interleaved modulated symbols in the wireless network via the radio access technology.

Certain aspects of the present disclosure provide an apparatus for wireless communications in a wireless network via a radio access technology. The apparatus generally includes at least one processor configured to determine dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element. The at least one processor may also be configured to perform the interleaving of the modulated symbols according to the matrix having the determined dimensions. The apparatus also generally includes a memory coupled with the at least one processor. The apparatus also generally includes a transmitter configured to transmit the interleaved modulated symbols in the wireless network via the radio access technology.

Certain aspects of the present disclosure provide an apparatus for wireless communications in a wireless network via a radio access technology. The apparatus generally includes means for determining dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element, means for performing the interleaving of the modulated symbols according to the matrix having the determined dimensions, and means for transmitting the interleaved modulated symbols in the wireless network via the radio access technology.

Certain aspects of the present disclosure provide a non-transitory computer-readable medium for wireless communications in a wireless network via a radio access technology. The non-transitory computer-readable medium generally includes instructions that, when executed by at least one processor, configure the at least one processor to determine dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element. The non-transitory computer-readable medium also generally includes instructions that configure the at least one processor to perform the interleaving of the modulated symbols according to the matrix having the determined dimensions. The non-transitory computer-readable medium also includes instructions that configure the at least one processor to transmit the interleaved modulated symbols in the wireless network via the radio access technology (e.g., via a transmitter and one or more antennas).

Certain aspects of the present disclosure provide a method for wireless communications in a wireless network via a radio access technology. The method generally includes receiving modulated symbols in the wireless network via the radio access technology, determining dimensions of a matrix used for performing de-interleaving of the modulated symbols carrying bits, from a plurality of code blocks, which are mapped into bundles of resource elements, in an orthogonal frequency division multiplexed (OFDM) system, based, at least in part, on one of a ratio of a code block size to a number of bits mapped into each resource element or the number of bits mapped into each resource element, and performing the de-interleaving of the modulated symbols according to the matrix having the determined dimensions.

Certain aspects of the present disclosure provide an apparatus for wireless communications in a wireless network via a radio access technology. The apparatus generally includes a receiver configured to receive modulated symbols in the wireless network via the radio access technology. The apparatus also generally includes at least one processor configured to determine dimensions of a matrix used for performing de-interleaving of the modulated symbols carrying bits, from a plurality of code blocks, which are mapped into bundles of resource elements, in an orthogonal frequency division multiplexed (OFDM) system, based, at least in part, on one of a ratio of a code block size to a number of bits mapped into each resource element or the number of bits mapped into each resource element. The at least one processor may also be configured to perform the de-interleaving of the modulated symbols according to the matrix having the determined dimensions. The apparatus also includes a memory coupled with the at least one processor.

Certain aspects of the present disclosure provide an apparatus for wireless communications in a wireless network via a radio access technology. The apparatus generally includes means for receiving a modulated symbols in the wireless network via the radio access technology, means for determining dimensions of a matrix used for performing de-interleaving of the modulated symbols carrying bits, from a plurality of code blocks, which are mapped into bundles of resource elements, in an orthogonal frequency division multiplexed (OFDM) system, based, at least in part, on one of a ratio of a code block size to a number of bits mapped into each resource element or the number of bits mapped into each resource element, and means for performing the de-interleaving of the modulated symbols according to the matrix having the determined dimensions.

Certain aspects of the present disclosure provide a non-transitory computer-readable medium for wireless communications in a wireless network via a radio access technology. The non-transitory computer-readable medium generally includes instructions that, when executed by at least one processor, configure the at least one processor to receive a modulated symbols in the wireless network via the radio access technology (e.g., via a receiver and one or more antennas), determine dimensions of a matrix used for performing de-interleaving of the modulated symbols carrying bits, from a plurality of code blocks, which are mapped into bundles of resource elements, in an orthogonal frequency division multiplexed (OFDM) system, based, at least in part, on one of a ratio of a code block size to a number of bits mapped into each resource element or the number of bits mapped into each resource element, and perform the de-interleaving of the modulated symbols according to the matrix having the determined dimensions.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 13A-13B illustrate a reverse mapping method for resource elements in a resource block, in accordance with certain aspects of the present disclosure.

FIGS. 14A and 14B illustrate a table representation of the resource element interleaving illustrated in FIGS. 13A and 13B, in accordance with certain aspects of the present disclosure.

FIG. 15 illustrates the reverse mapping approach to interleaving, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
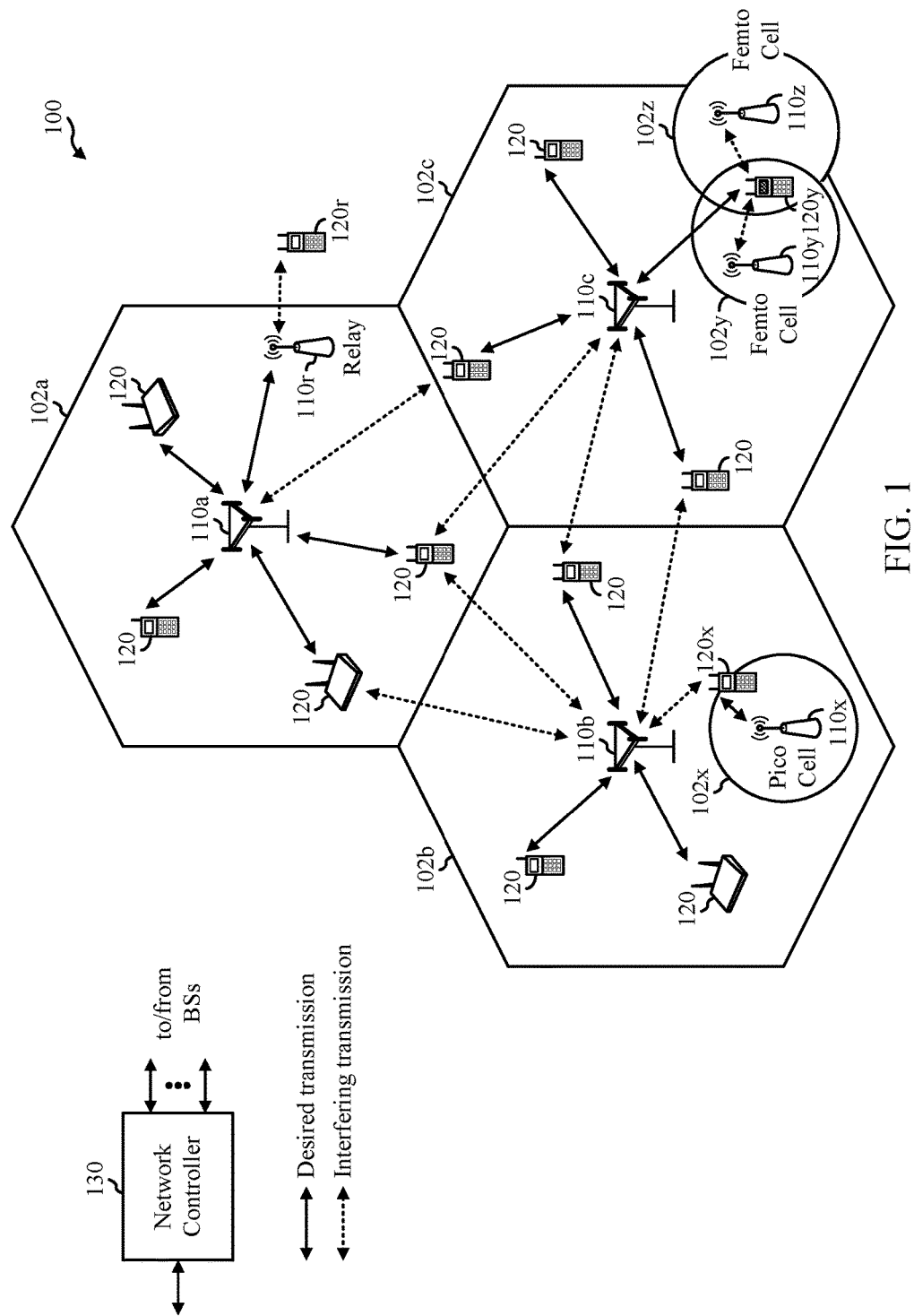
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

NR is expected to support large bandwidth allocations. However, code blocks (CBs) are expected to only span limited frequency bandwidth (e.g., 3 MHz). Thus, additional frequency diversity may be exploited (e.g., by using frequency interleaving) to provide significant gains, such that the CB spans the entire bandwidth allocation. Thus, aspects of the present disclosure relate to a quantized k-resource element row-column interleaver that may be used to provide additional frequency diversity. In some cases, the quantized k-resource element row-column interleaver may also be used to perform interleaving in the time domain.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, techniques presented herein may be used to improve frequency diversity in code blocks.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for system bandwidth of 1.25, 2.5, 5, 10 or 20 MHz, respectively.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or one or more DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and one or more DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
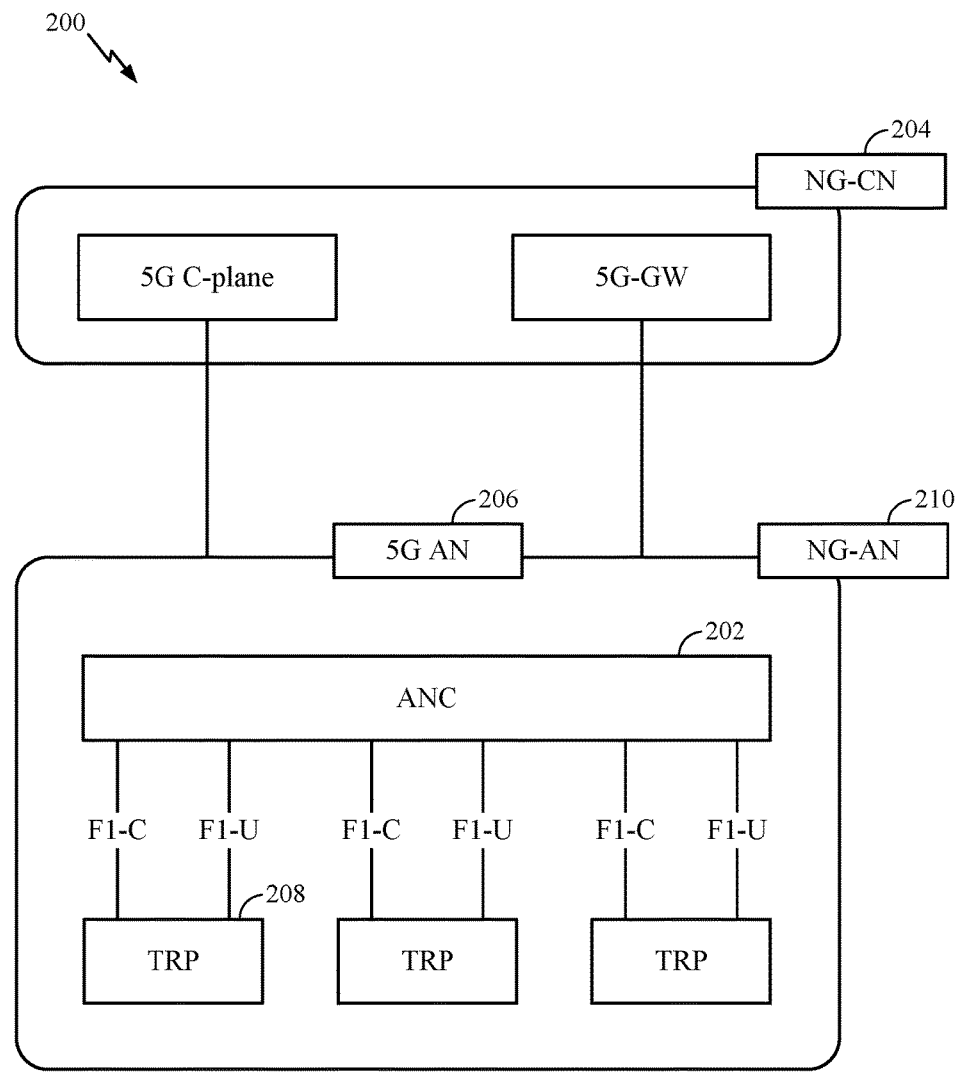
FIG. 2 is a block diagram illustrating an example logical architecture of a distributed RAN, in accordance with certain aspects of the present disclosure.

FIG. 2 illustrates an example logical architecture 200 of a distributed radio access network (RAN), which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell" and may refer to a region where a same set of radio resources are available throughout the region.

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
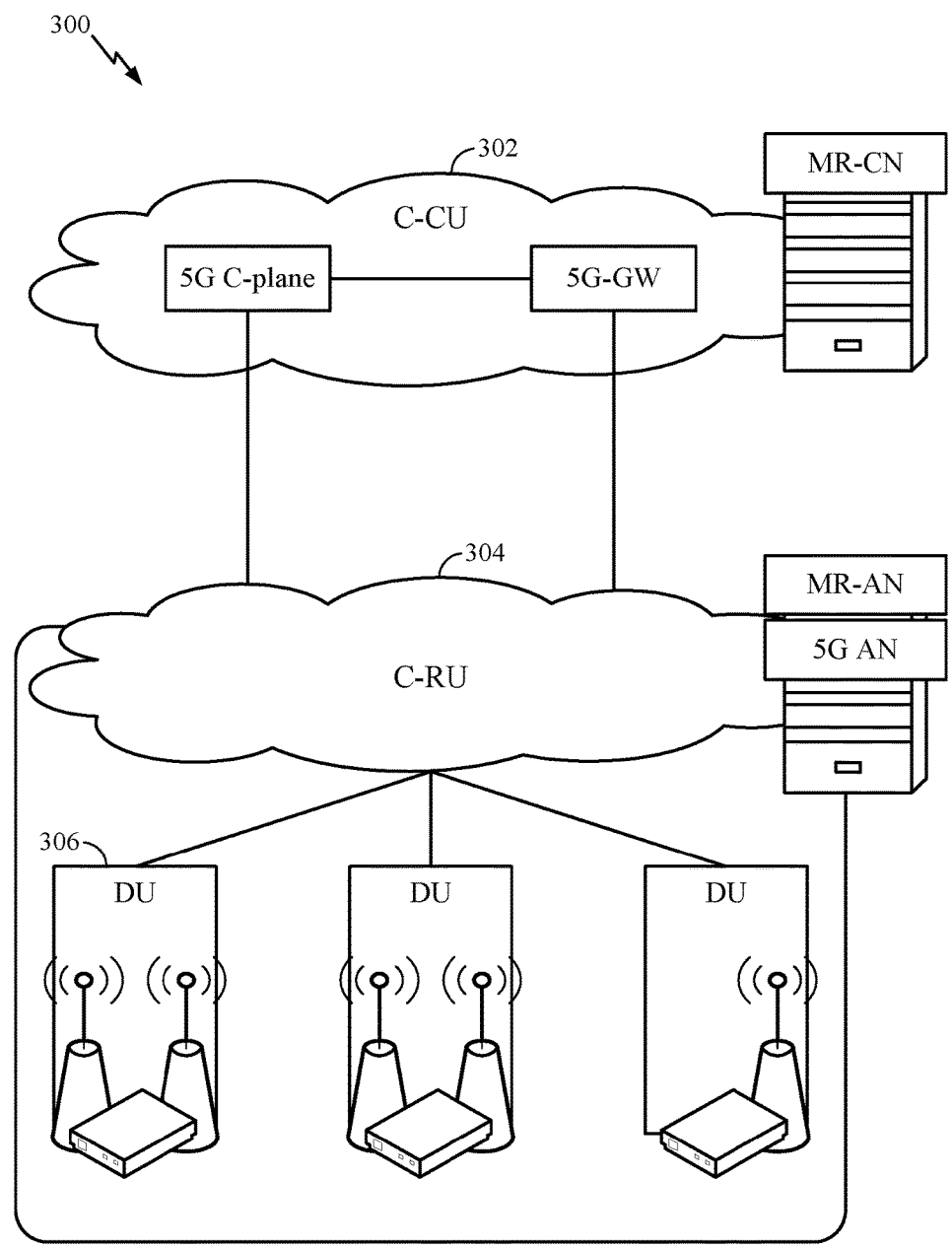
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
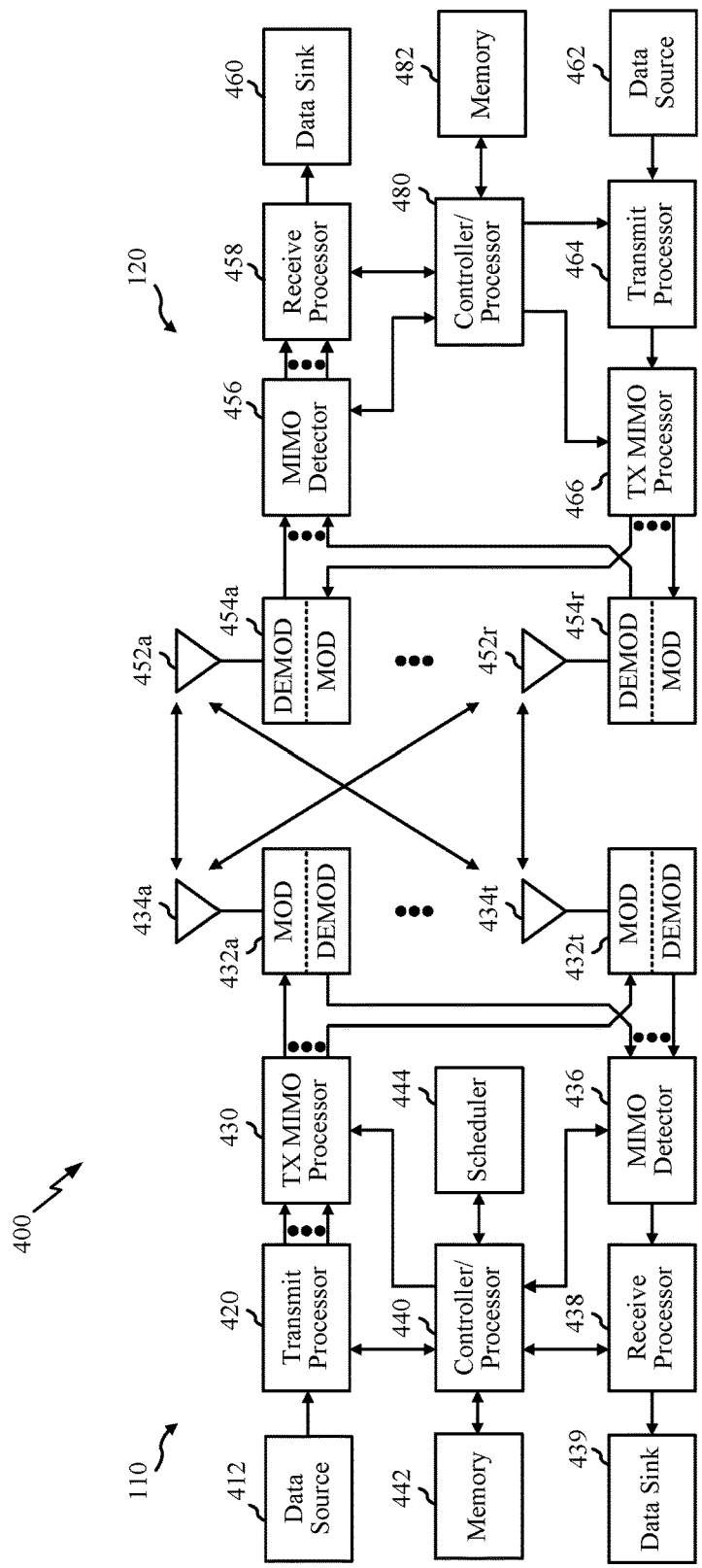
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8A-8B.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, de-interleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 8 and/or 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
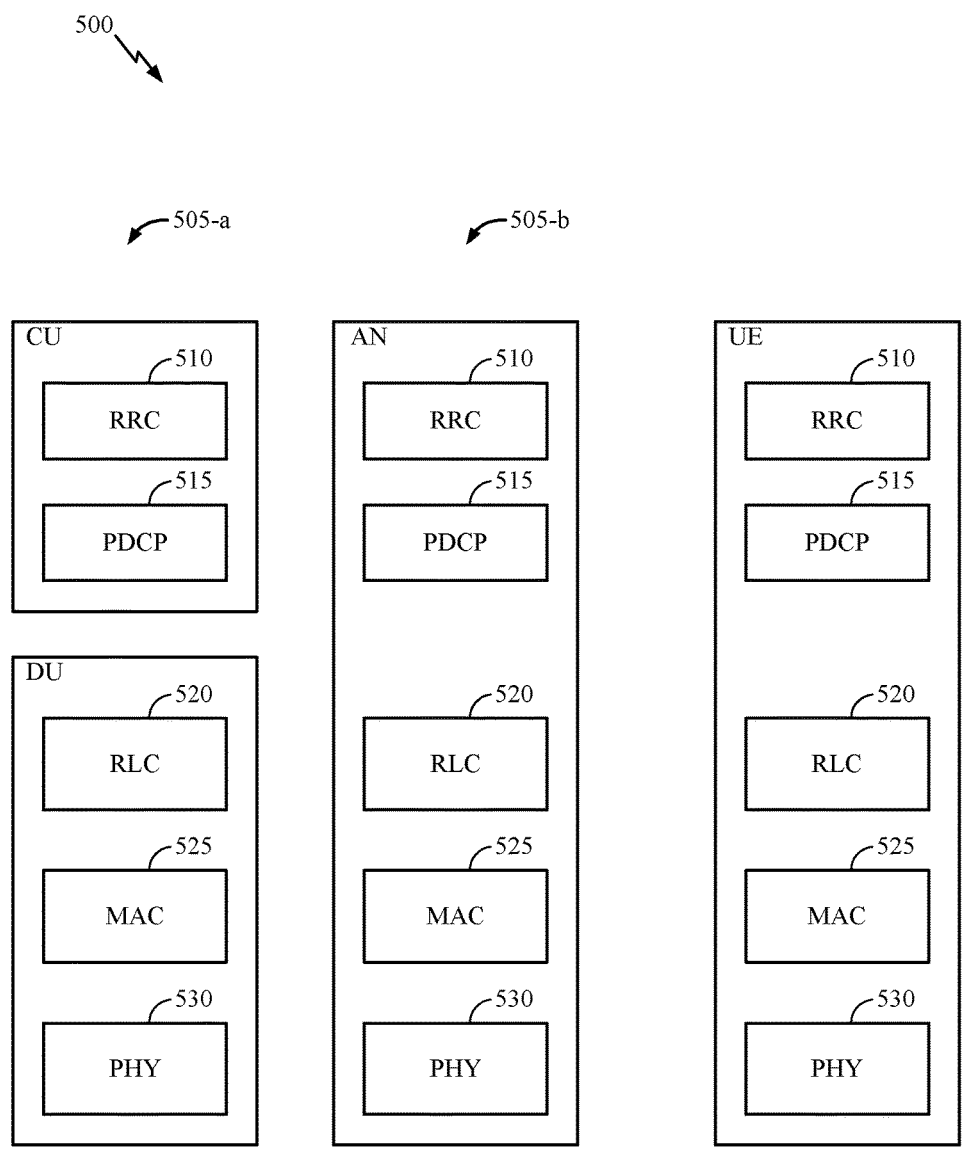
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or one or more DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
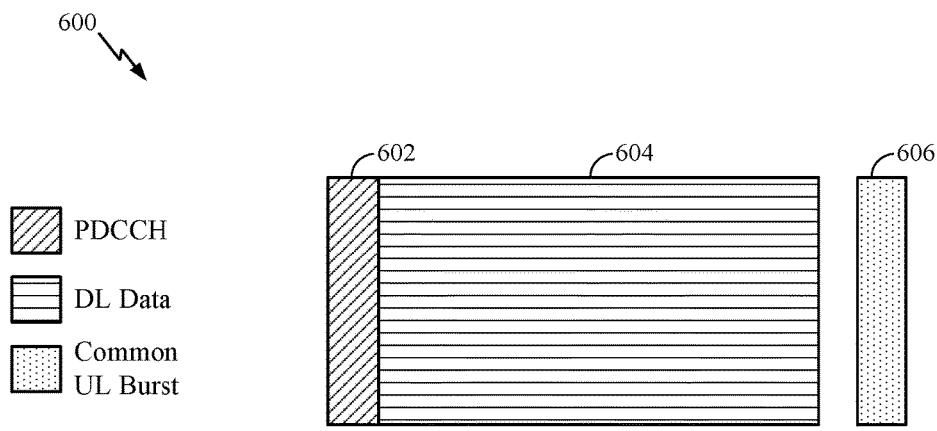
FIG. 6 illustrates an example of a DL-centric subframe, in accordance with certain aspects of the present disclosure.

FIG. 6 is a diagram 600 showing an example of a DL-centric subframe, which may be used to communicate in the wireless network 100. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
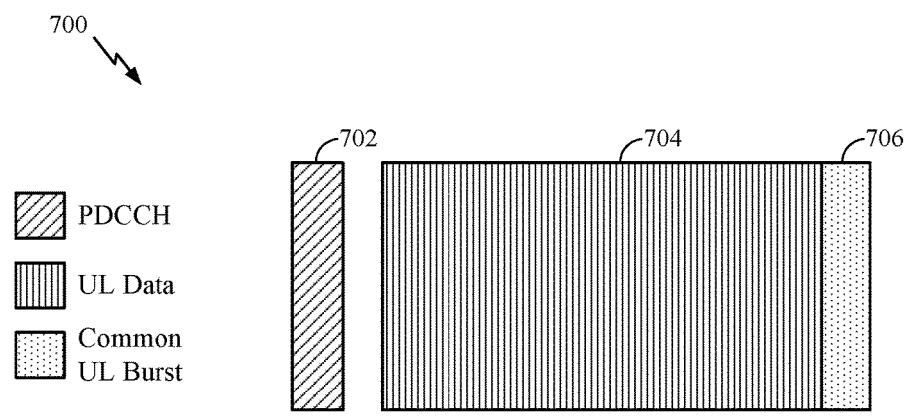
FIG. 7 illustrates an example of an UL-centric subframe, in accordance with certain aspects of the present disclosure.

FIG. 7 is a diagram 700 showing an example of an UL-centric subframe, which may be used to communicate in the wireless network 100. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Quantized K-Resource Element Row-Column Interleaver 5G radio (e.g., new radio (NR)) is expected to support large bandwidth allocations. However, code blocks (CBs) are expected to only span limited frequency bandwidth (e.g., 3 Mhz). Thus, additional frequency diversity may be exploited (e.g., by using frequency interleaving) to provide significant gains, such that the CB spans an entire bandwidth allocation. Each OFDM symbol in 5G may carry many CBs, especially in systems with medium and high spectral efficiency.

In some cases, if the bandwidth allocation is small, and one CB spans the whole OFDM symbol, there might not be a need for frequency interleaving. A frequency interleaving design could take that into consideration. For example, an interleaver may determine a size of a bandwidth allocation and decide whether or not to apply frequency (e.g., k-resource element) interleaving. Such a decision (i.e., whether or not to use frequency interleaving) may be based on whether there is bursty interference or a type of traffic (e.g., if the traffic is ultra-reliable low latency communications (URLLC) traffic). It should be noted that while aspects of the present disclosure are described in relation to k-resource element interleaving, aspects of the present disclosure apply equally to tones and subcarriers. That is, techniques presented herein with respect to k-resource element interleaving may equally apply to k-tone and/or k-subcarrier interleaving as well.

According to certain aspects, resource element-based frequency interleaving may allow for pipelined decoding. For example, since de-interleaving is performed on the resource element level, before the demapper, log-likelihood ratios (LLRs) used for decoding after the demapper are "in-order" and ready for decoding.

Figure 8A:
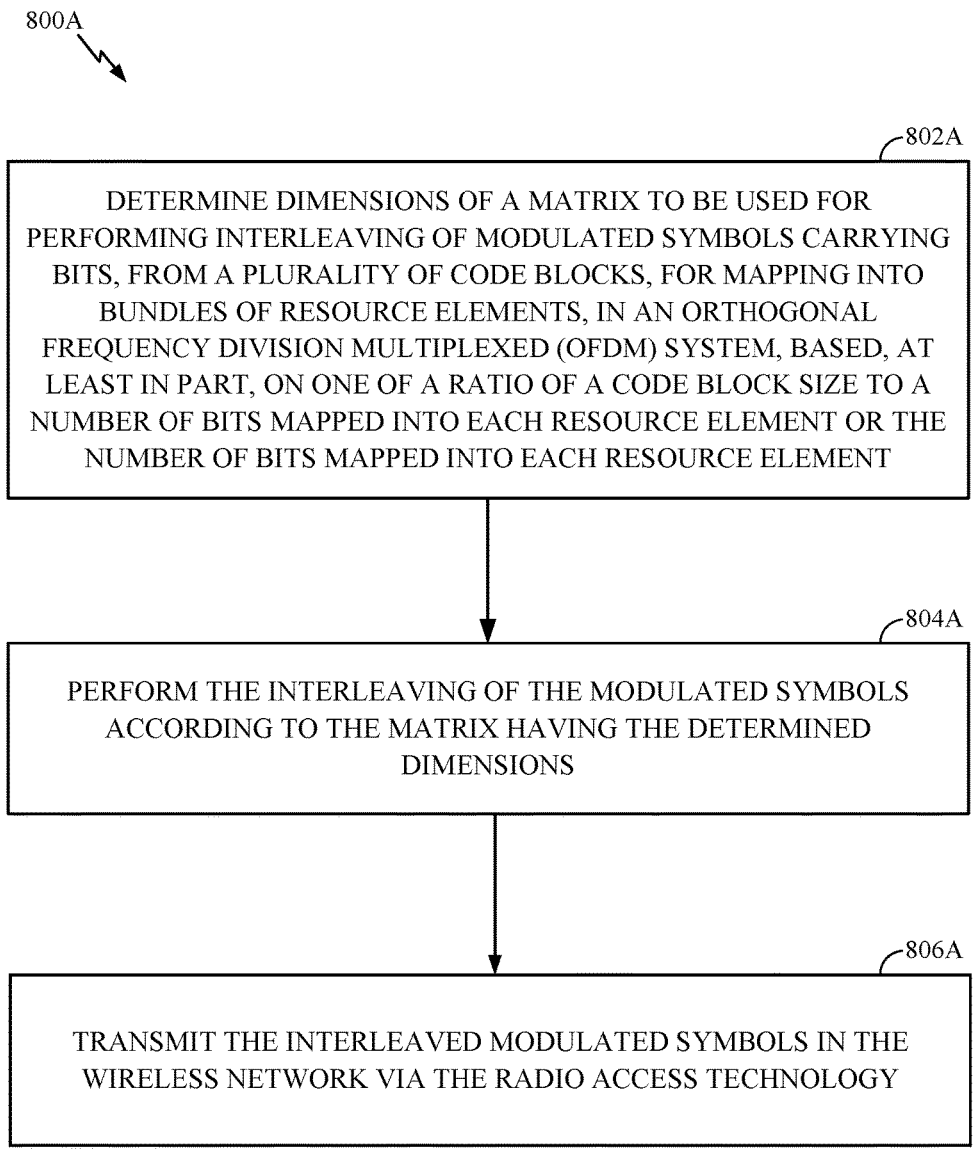
FIGS. 8A-8B illustrate example operations for wireless communications, in accordance with certain aspects of the present disclosure.

FIG. 8A illustrates example operations 800A for wireless communications in a wireless network via a radio access technology (e.g., LTE, 5G NR, Wi-Fi, etc.). According to certain aspects, operations 800A may be performed by a wireless communication device such as, for example, a base station (e.g., eNB 110) and/or user equipment (UE) (e.g., UE 120).

According to aspects, the base station may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein. Additionally, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 800A begin at 802A by determining dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element.

For example, a wireless communication device that implements example operations 800A may first identify a plurality of code blocks for over-the-air transmission. Each code block may have a given size (i.e., a number of code block bits) and may utilize a particular modulation scheme (e.g., 16QAM, 64QAM, etc.). The transmission may include a number of spatial layers such that different ones of the code blocks are transmitted on different layers of the transmission.

Prior to transmission, the modulated symbols which carry bits of the plurality of code block are interleaved to provide frequency and/or time diversity. In one arrangement, a wireless communication device determines dimensions of a matrix to be used for performing the interleaving of the modulated symbols carrying the code block bits. This may include determining a number of rows and a number of columns for the matrix based on one or more of the number of code block bits, the number of layers in the transmission, the modulation scheme used for each layer, and an RE bundle size/number of tones. For example, the dimensions of the matrix may be based on a ratio of the code block size to the number of bits to be mapped into each resource element or, alternatively, based on the number of bits to be mapped into each resource element without the ratio. In one arrangement, a number of REs per code block is determined based on a number of coded block bits to transmit, the number of layers of the transmission, and the type of modulation used. The dimensions of the matrix (e.g., number of rows and columns) may be determined based on a number of REs per code block. As described herein, some or all of these values may be stored in one or more lookup tables and retrieved by a wireless communications device according to its transmission parameters. The lookup table(s) may be represent a limited set (quantization) of all possible values and, in some cases, the wireless communication device may select a value from the lookup that corresponds to a calculated value (e.g., selecting among quantized values in the lookup table based on difference between the quantized value and a calculated value) as part of determining the matrix dimensions.

At 804A the wireless communications device performs the interleaving of the modulated symbols according to the matrix having the determined dimensions. Performing the interleaving may involve using a row-column interleaver to achieve a level of separation of the modulated symbols of the same CB in accordance with the equations and examples herein. In one aspect, interleaved modulated symbols which result from use of the matrix are mapped to OFDM symbols for over-air-transmission. This mapping may alternate such that it proceeds from top-to-bottom for a first OFDM symbol, then from bottom-to-top for a second OFDM symbol, then returns to a top-to-bottom approach for a next OFDM symbol, etc. Also, a cyclic shift may be applied to the interleaved modulated symbols. This may involve, for example, starting the mapping at a particular resource element index within an OFDM symbols. Combinations of these techniques may be used to ensure a robust transmission, At 806A, the wireless communications device transmits the interleaved modulated symbols in the wireless network via the radio access technology.

Figure 8B:
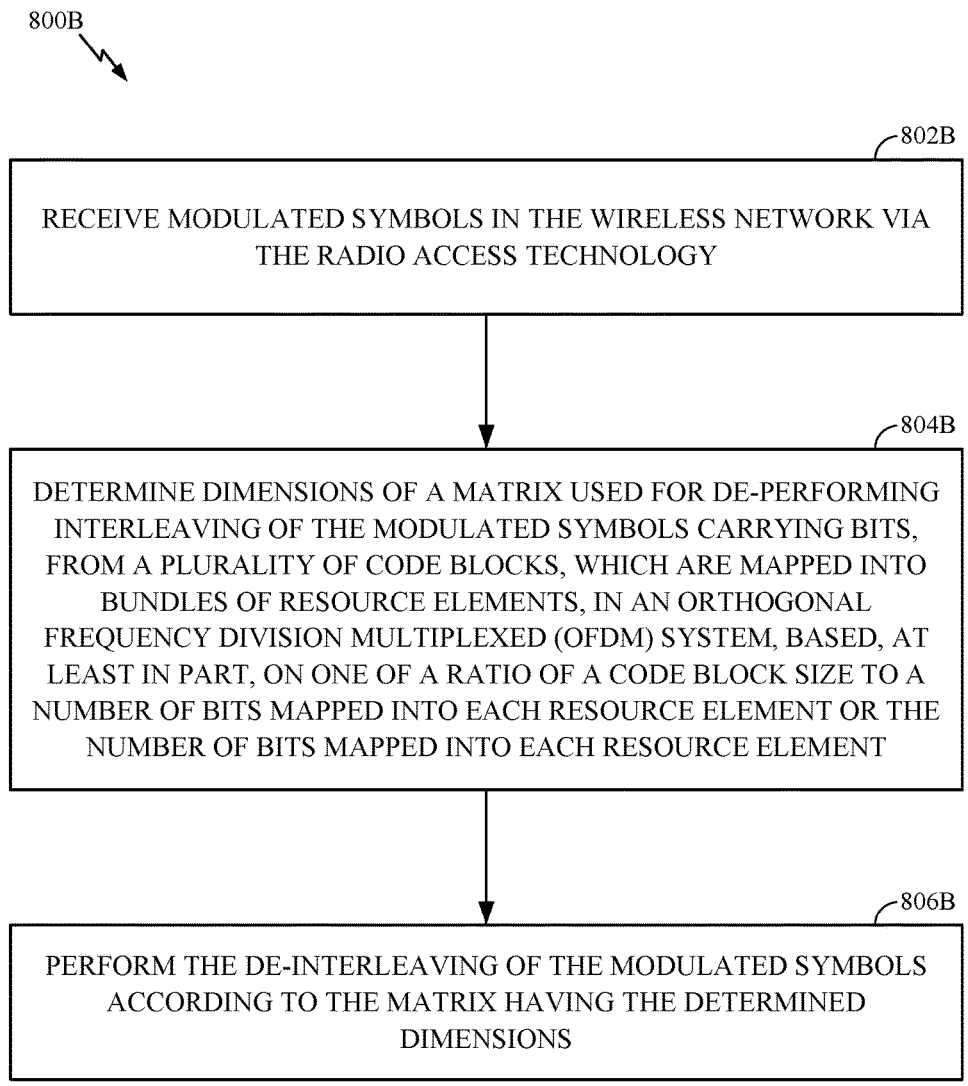

FIG. 8B illustrates example operations 800B for wireless communications in a wireless network via a radio access technology (e.g., LTE, 5G NR, Wi-Fi, etc.). According to certain aspects, operations 800B may be performed by a wireless communications device such as, for example, base station (e.g., BS 110) and/or user equipment (e.g., UE 120). Example operations 800B represent deinterleaving techniques which may complement example operations 800A. For instance, example operations 800A may be applied by a transmitter and example operations 800B may be applied by a receiver Operations 800B begin at 802B with a wireless communications device receiving interleaved modulated symbols in the wireless network via the radio access technology (e.g., using a receiver and one or more antennas). For example, in some cases, the wireless communications device may receive OFDM symbols transmitted by a wireless communication device using example operations 800A.

At 804B, the wireless communications device determines dimensions of a matrix used for performing de-interleaving of the modulated symbols carrying bits, from a plurality of code blocks, which are mapped into bundles of resource elements, in an orthogonal frequency division multiplexed (OFDM) system, based, at least in part, on one of a ratio of a code block size to a number of bits mapped into each resource element or the number of bits mapped into each resource element.

For example, similar to example operations 800A, the wireless communications device may determine a number of code block bits, a number of layers in the received transmission, and a modulation and coding scheme utilized with each of the layers. Based on some or all of this information, a wireless communication device may determine a ratio of code block size to the number of bits mapped into each resource element (or just the number of bits mapped into each resource element) and may form its deinterleaving matrix accordingly. As with example operations 800A, parts of this information may retrieved from a lookup table.

At 806B, the wireless communications device performs the de-interleaving of the modulated symbols according to the matrix having the determined dimensions. Performing the deinterleaving may also include demapping the OFDM symbols in accordance with the transmit scheme (alternative columns, cyclic shifting, etc.).

Figure 9A:
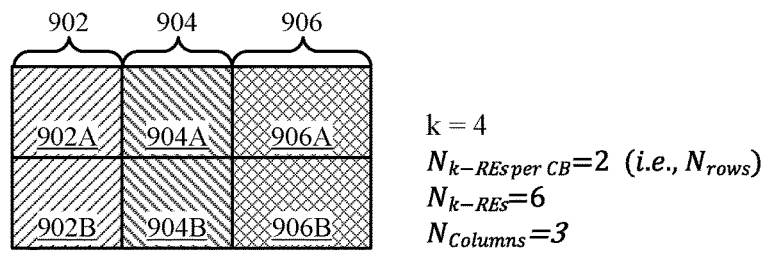
FIGS. 9A-9C illustrate an example of resource element-based frequency interleaving, according to certain aspects of the present disclosure.
Figure 9B:
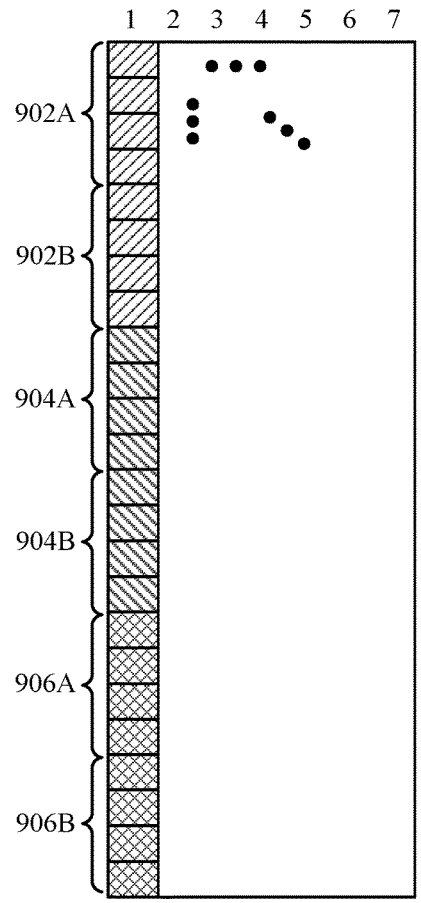
Figure 9C:
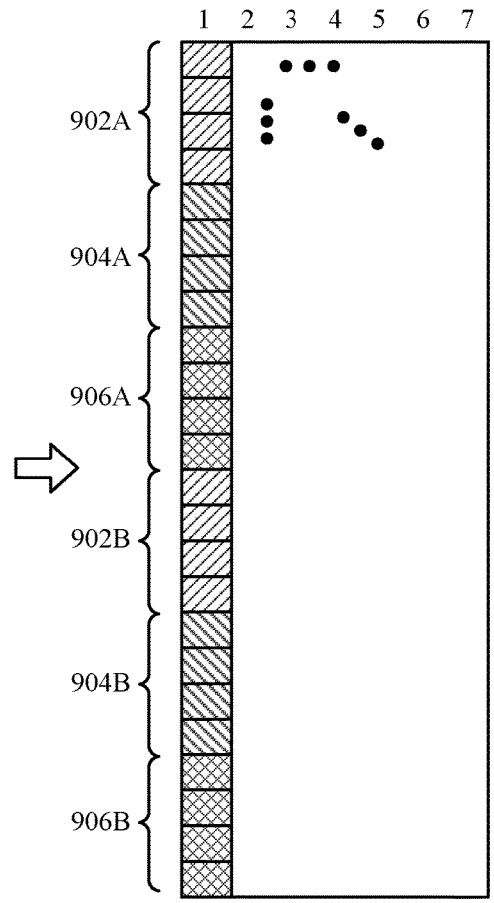

FIG. 9A-9C illustrate an example of resource element-based frequency interleaving, according to certain aspects of the present disclosure. According to aspects, interleaving may be performed on a k-resource element basis per OFDM symbol. For example, for row-column interleaving, k-resource elements of the same CB may be separated as much as possible, as illustrated in FIG. 9C.

For example, FIG. 9A illustrates a resource element (RE) matrix, assuming a value of k=4 (e.g., bits per resource element), $N_{k-REs\ per\ CB}=2$ (i.e. $N_{rows}$), $N_{k-REs}=6$, and $N_{columns}=3$. As illustrated, the matrix in FIG. 9A comprises a plurality of CBs (902, 904, 906) including bits mapped to resource elements 902A, 902B, 904A, 904B, 906A, and 906B (four bits, k, mapped to each RE and filling multiple symbols (1-7) of the matrix).

According to aspects, the resources bits may typically be written to along a column and read from along a row, as illustrated in FIG. 9B. For example, as illustrated in FIG. 9B, the resource elements in the first column of the resource element matrix illustrated in FIG. 9A (e.g., 902A and 902B) may first be written to column 1 in FIG. 9B, then the resource elements in the second column of the resource element matrix in FIG. 9A (e.g., 904A and 904B) may be written to column 1 in FIG. 9B, and finally, the resource elements in the third column of the resource element matrix in FIG. 9A (e.g., 906A and 906B) may be written to column 1 in FIG. 9B. However, generating a CB mapping in this fashion may lead to performance degradation in practice due to interference.

Instead, the k-resource elements of the CBs 902, 904, 906 may be interleaved such that the k-resource elements of the same CB may be separated as much as possible. For example, instead of writing the CB along the columns, the CB may be written along the rows. For example, as illustrated in FIG. 9C, resource element 902A in FIG. 9A may first be written to column 1 of FIG. 9C, then resource element 904A, then 906A, then 902B, etc. According to aspects, interleaving the k-resource elements of a CB in this fashion may improve performance by reducing fading experienced by like-resource elements. For example, since 902A and 902B (i.e., like-resource elements) are separated into different frequencies of a channel, they may not both experience as strong as fading as if they were located next to each other (e.g., as illustrated in FIG. 9B). As a result, decoding performance at a receiver may be improved due to a decrease in fading between like-resource elements, leading to power savings at the receiver. Additionally, interleaving in this manner may improve the usage of resources transmitted in the wireless network, for example, by reducing the number of retransmissions that would need to be made due to fading experienced between like-resource elements without performing interleaving in this manner.

According to aspects, how far the k-resource elements of the same CB should be separated may be determined based on certain factors. For example, the dimensions of the resource element matrix may be determined by the wireless communications device such that the number of rows is $$N_{rows} = \left\lceil \frac{N_{CB\ bits}}{N_{Layers} * N_{QAM} * k} \right\rceil,$$

where $N_{CB\ bits}$ is the number of bits in a code block, $N_{Layers}$ is the number of transmission layers used to transmit the CBs of this codeword, $N_{QAM}$ is the number of modulation schemes used to modulate the CBs when all layers have the same QAM order, and the number of columns is $$N_{Columns} = \left\lceil \frac{N_{k-REs}}{N_{rows}} \right\rceil,$$

where $N_{k-REs}$ is the number of REs that are available for mapping the CBs. It may be noted that $N_{CB\ bits}$ can potentially refer to either a nominal CB size, that is, before any rate matching has occurred, or after the rate matching process. In the special case that k=1, $N_{rows}$ may correspond to the number of REs that are needed for transmitting a CB with $N_{CB\ bits}$. For example, if k=1, then each resource element group has 1 RE, which means that $$N_{rows} = \left\lceil \frac{N_{CB\ bits}}{N_{Layers} * N_{QAM}} \right\rceil$$

is the number of REs needed to transmit a codeblock (e.g., each RE carries N_layers QAM symbols, and each QAM symbol carries N_QAM bits).

In some cases, each transmission layer may employ a different quadrature amplitude modulation (QAM) modulation. In this case, the number of rows of the matrix may be computed by accounting for the total number of bits of the CBs that are modulated in each resource element, according to $$N_{rows} = \left\lceil \frac{N_{CB\ bits}}{\left(\sum_{i=1}^{N_{Layers}} N_{QAM_i}\right) * k} \right\rceil.$$

Figure 10:
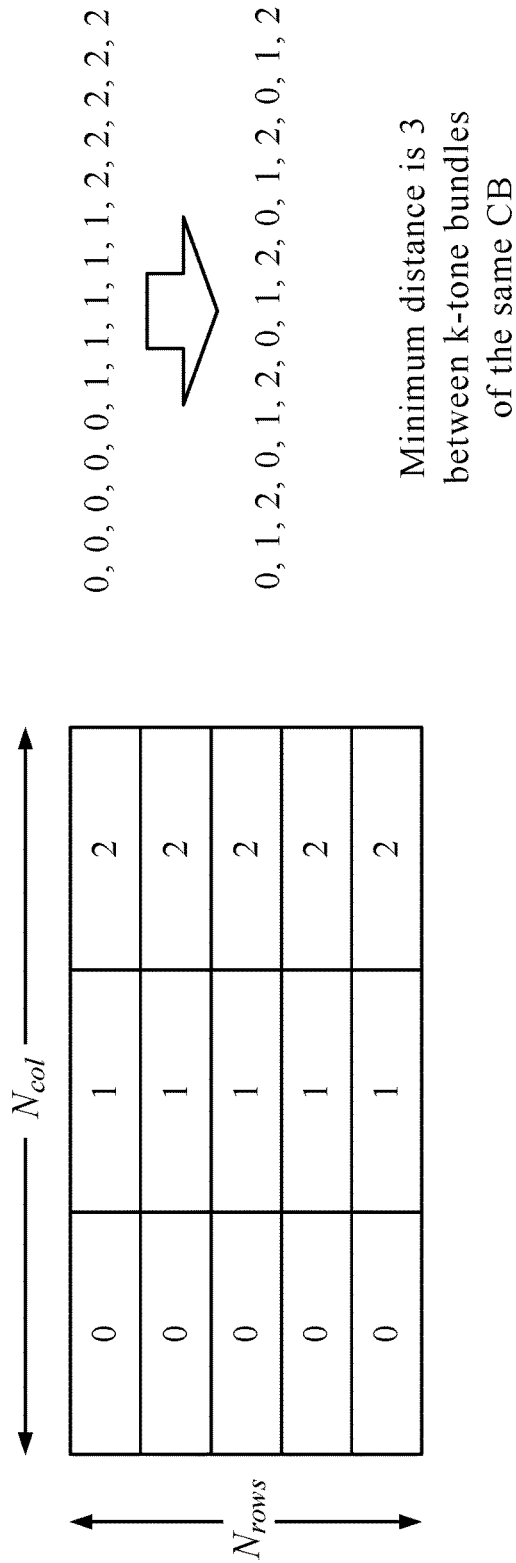
FIG. 10 illustrates an example of accounting for the total number of bits of the CBs that are modulated in each resource element, in accordance with certain aspects of the present disclosure.

FIG. 10 illustrates an example of accounting for the total number of bits of the CBs that are modulated in each resource element. The example illustrated in FIG. 10 assumes a k-resource element bundle of 15 (e.g., $N_{total}=15$), which carries three CBs. According to aspects, $N_{col}$ and $N_{rows}$ may need to be chosen such that $N_{col}*N_{rows} \geq N_{total}$. According to aspects, $N_{col}$ and $N_{rows}$ may be chosen by the wireless communications device such that the k-resource element bundles carrying one CB span one column. According to aspects, choosing $N_{col}$ and $N_{rows}$ such that the k-resource element bundles carrying one CB span one column may help ensure that after interleaving the k-resource element bundles of the same CB are separated as much as possible. However, this means that the row-column operation depends on the span of each CB in the frequency domain.

For example, consider a scenario with $N_{CB\ bits}=1008$ bits, and k=12, mapped into 15 resources elements, each one carrying 4 layers with QAM order as $N_{QAM_1}=8$, $N_{QAM_2}=6$, $N_{QAM_3}=8$, $N_{QAM_4}=6$ respectively. Then, as illustrated in FIG. 10, the resource element matrix dimensions may be chosen such that the resource elements of CBs 0, 1, and 2 are each situated within their own column of the resource element matrix (e.g., $$N_{rows} = \left\lceil \frac{1008}{(8+8+6+6)*12} \right\rceil = 3,$$

$$N_{col} = \left\lceil \frac{15}{3} \right\rceil = 5,).$$

The resource elements of each CB may then be read along the rows of the resource element matrix, giving rise to the resource element sequence 0,1,2,0,1,2,0,1,2,0,1,2,0,1,2, as illustrated. According to aspects, the minimum distance between the k-resource element bundles of the same CB is three (e.g., 0, 1, 2, and then 0 again).

Figure 11A:
FIGS. 11A-11B illustrate example resource element matrices with different chosen dimensions, in accordance with certain aspects of the present disclosure.
Figure 11B:
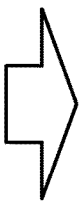

According to certain aspects, as illustrated in FIG. 11A, if $N_{col}$ is chosen by the wireless communications device to be larger (e.g., 8), then $N_{rows}$ will be smaller (e.g., 2). In such a case, after-interleaving consecutive k-resource element bundles may appear or the minimum distance across k-resource element bundles of the same CB may become higher. Additionally, according to certain aspects, as illustrated in FIG. 11B, if $N_{col}$ is chosen by the wireless communications device to be smaller (e.g., 2), then $N_{rows}$ will be larger (e.g., 8). In such a case, after-interleaving consecutive k-resource element bundles may appear or the minimum distance across k-resource element bundles of the same CB may become higher.

In some cases, it may be beneficial to quantize the possible values of $$N_{REs\ per\ CB} = \frac{N_{CB\ bits}}{\left( \sum_{i=1}^{N_{Layers}} N_{QAM_i} \right)}$$

to a limited set, for example, by generating a look-up table (LUT), from which $N_{REs\ per\ CB}$ may be determined by the wireless communications device. For example, for different modulation, layers, and/or CB sizes, $N_{REs\ per\ CB}$ may be calculated by the wireless communications device and a corresponding value in the LUT table may be chosen. For example, if $N_{REs\ per\ CB}$ is calculated by the wireless communications device to be 120, a value of 128 may be chosen from the LUT, for example, as illustrated in the LUT shown in FIG. 12A.

According to aspects, the row-column interleaver may then determine $N_{Columns}$ and $N_{Rows}$ of the resource element-matrix according to $$N_{Columns} = \left\lceil \frac{N_{k-REs}}{N_{rows}} \right\rceil,$$

$$N_{rows} = \left\lceil N_{REs\ per\ CB} \frac{1}{k} \right\rceil.$$

According to certain aspects, if more than one value of k is supported, the same LUT table may be used. In some cases, additional randomization may be added into the choice of $N_{REs\ per\ CB}$ by randomly picking a subset of the values that belong on the LUT table. According to aspects, this randomization may depend on a slot index, a symbol index, user equipment (UE) identifier (ID), and/or a cell ID.

Figures 12A, 12B:
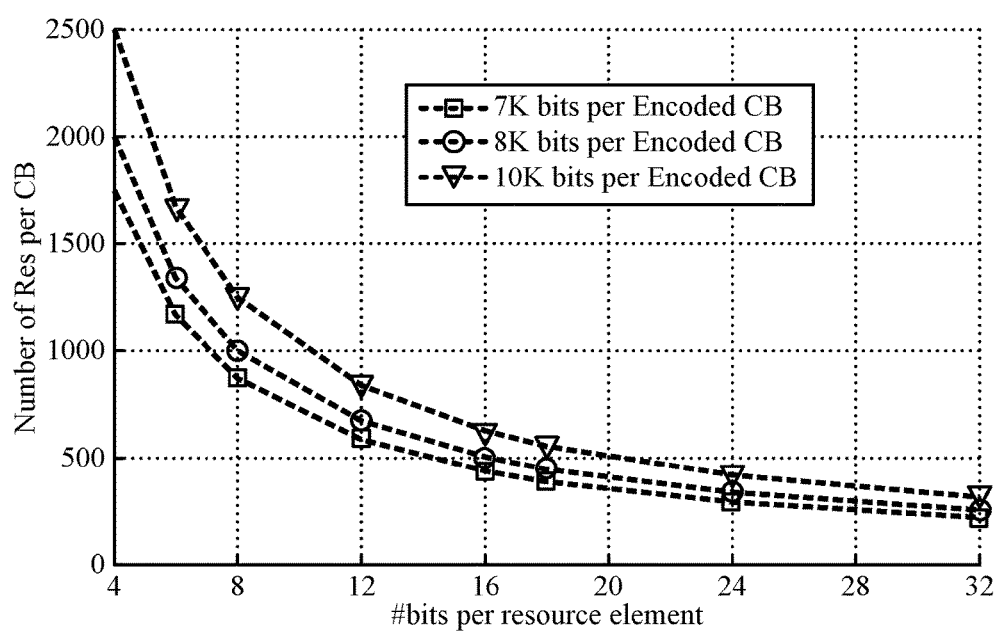
FIGS. 12A-12B illustrate an example quantization technique that may be used in combination with frequency interleaving, in accordance with certain aspects of the present disclosure.

FIG. 12A illustrates a table of example values that may be supported by a LUT, according to certain aspects of the present disclosure. For example, as illustrated a LUT may support $N_{REs\ per\ CB}$ values of 64, 128, 256, and 512. It should be noted that other values may also be supported. According to aspects, when a CB spans a lot (e.g., a first number) of REs (e.g., 512), then it is likely that no additional frequency diversity is needed. However, when a CB spans a lower amount (e.g., a second number) of REs (e.g., ~128), additional frequency diversity may be needed to overcome certain performance issues, such as fading.

FIG. 12B is a graph illustrating a curve of a number of bits per encoded CB, according to certain aspects of the present disclosure. As shown, as the number of REs per CB increases, the number of bits per-resource element decreases, and as the number of REs per CB decreases, the number of bit per-resource element increases. According to aspects, the curve in FIG. 12B may be used to illustrate the quantization technique described above. For example, as illustrated, since the number of bits per-resource element for $N_{REs\ per\ CB}$ values of about 800-2500 remains at about 8, there is no real benefit of having a larger $N_{REs\ per\ CB}$ value. Thus, these $N_{REs\ per\ CB}$ values may be quantized, for example, to 800 according to the LUT. Similarly, as the number of bits per-resource element increases, the number of REs per CEs tends to level out. For example, between the values of 20-32 bits per-resource element, the $N_{REs\ per\ CB}$ stays largely the same. Thus, the $N_{REs\ per\ CB}$ may be quantized to 256 according to the LUT illustrated in FIG. 12A.

According to certain aspects, a wireless communications device (e.g., a base station) may configure interleaver types used for the data communications at the UE. In some cases, these interleaver types may include frequency interleaving, time interleaving, or both. In such a case, a different look up table may be needed for different interleaver types. According to aspects, the base station may transmit interleaver-type configuration information to the UE using RRC signaling, layer 2 signaling, layer 1 signaling (dynamic signaling), or a combination of them. According to aspects, in a combination approach, for example, the base station could specify (e.g., in an RRC message) an index of the LUT to be used, and then in a layer 1 message, the base station could specify which type of LUT should eventually be used at each slot/multi-slot/symbol.

In some cases, when performing interleaving, the wireless communications device may use a reverse mapping approach, for example, for every other symbol of a resource block, as illustrated in FIGS. 13A and 13B. For example, in a reverse mapping approach, all codeblocks may be spread out in all the BW as illustrated in FIG. 13A. According to aspects, $N_{REs\ per\ CB}$, described above, may be used for this interleaving approach. According to aspects, for every other symbol, when read out from the row-column matrix, interleaving may be performed by mapping into the resources either from the end or the start of the current symbol. For example, as illustrated in FIG. 13B, for the $2^{nd}$ symbol (e.g., column 2) the wireless communications device begins interleaving by mapping the tones backwards. For example, given the second column in FIG. 13A, the wireless communications device begins by mapping one resource element from codeblock 1302 (e.g., RE 4) to the bottom/end of column 2 in FIG. 13B at 1305. The wireless communications device may then map a resource element from codeblock 1304 (e.g., RE 4) to column 2 in FIG. 13B at 1310. The wireless communications device may then map a resource element from codeblock 1306 (e.g., RE 4) to column 2 in FIG. 13B at 1315.

FIGS. 14A and 14B illustrate a table representation of resource element interleaving illustrated in FIGS. 13A and 13B, according to certain aspects of the present disclosure. For example, FIG. 14A illustrates resource elements from column 1 of FIG. 13A and FIG. 14B illustrates resource elements from column 2 of FIG. 13A. According to aspects, the mapping illustrated in FIG. 13B may correspond to reading the tables in 14A and 14B along the rows proceeding down the columns.

FIG. 15 illustrates the reverse mapping approach to interleaving discussed above, showing that the type of interleaving may vary with each column of the resource block. For example, with reference to FIG. 13B, interleaving for the first column (e.g., first OFDM symbol) of the resource block begins from top-to-bottom. For the second column (e.g., second OFDM symbol) of the resource block in FIG. 13B, interleaving begins at the bottom and proceeds to the top. For the third column (e.g., third OFDM symbol) of the resource block in FIG. 13B, interleaving begins from top-to-bottom, and so on. According to aspects, interleaving in such a manner helps ensure that a codeblock spans the entire transmitting bandwidth. For example, if this interchanging top-bottom or bottom-top does not happen, then in some cases a CB may only span part of the transmission bandwidth due to the quantization of $N_{REs\ per\ CB}$ based on the LUT. According to aspects, if the LUT is not used, and there is no quantization, such problem (e.g., CBs only spanning part of the transmission bandwidth) may not occur; however the LUT simplifies hardware design.

According to aspects, resource mapping can vary from Orthogonal Frequency Division Multiplexing (OFDM) symbol-to-OFDM symbol as part of the interleaving. For example, resource mapping may vary by applying a cyclic shift as part of the mapping to OFDM symbols. According to aspects, reverse resource mapping alternating OFDM symbols may also be used to improve frequency diversity. According to aspects, the start of the mapping (i.e., start from the upper/lower part of the resource block) may depend on a seed computed based at least on virtual cell ID, UE ID, symbol ID, HARQ ID, Tx/Re-Tx bit The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining and/or means for performing (interleaving/de-interleaving) may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented when the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 8A-8B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications in a wireless network via a radio access technology, comprising:
  determining dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element, wherein determining the dimensions of the matrix comprises:
    determining a number of rows of the matrix based, at least in part, on the one of the ratio of the code block size to the number of bits to be mapped into each resource element, or the number of bits to be mapped into each resource element; and
    determining a number of columns of the matrix based on the number of rows and a total number of bundles of resource elements;
  performing the interleaving of the modulated symbols according to the matrix having the determined dimensions; and
  transmitting the interleaved modulated symbols in the wireless network via the radio access technology.

2. The method of claim 1, further comprising performing the interleaving only in the frequency domain to separate the bundles of resource elements from a same code block in frequency.

3. The method of claim 1, further comprising performing the interleaving in both the frequency domain and the time domain to separate the bundles of resource elements from a same code block in both frequency and time.

4. The method of claim 1, wherein the number of bits to be mapped into each resource element comprises a sum of modulated bits per layer using different modulation schemes.

5. The method of claim 1, wherein the code block size is determined using a limited set of possible values for a number of resource elements (REs) per code block.

6. The method of claim 5, further comprising selecting a first possible value for the number of REs per code block from a lookup table (LUT).

7. The method of claim 6, wherein the LUT supports more than one bundle size of resource elements.

8. The method of claim 6, wherein selecting the first possible value from the LUT comprises:
  determining the number of REs per code block based on at least one of a modulation scheme, layer, or code block size; and
  selecting the first possible value in the LUT corresponding to the determined number of REs per code block.

9. The method of claim 6, wherein the first possible value is selected based, at least in part, on a slot index, a symbol index, a user equipment (UE) index, or a cell ID.

10. The method of claim 1, wherein a type of interleaving varies with each column in the matrix.

11. The method of claim 10, wherein performing the interleaving comprises applying a cyclic shift to alternating columns, corresponding to Orthogonal Frequency Division Multiplexing (OFDM) symbols, in the matrix.

12. The method of claim 10, wherein performing the interleaving comprises performing the interleaving in a reverse manner for alternating columns, corresponding to Orthogonal Frequency Division Multiplexing (OFDM) symbols, in the matrix.

13. The method of claim 10, wherein a starting point for beginning the interleaving is based at least in part on a virtual cell identifier (ID), a user equipment (UE) ID, a symbol ID, a hybrid automatic repeat request (HARQ) ID, or a transmission or re-transmission (Tx/Re-Tx) bit.

14. A method for wireless communications in a wireless network via a radio access technology, comprising:
  receiving modulated symbols in the wireless network via the radio access technology;
  determining dimensions of a matrix used for performing de-interleaving of the modulated symbols carrying bits, from a plurality of code blocks, which are mapped into bundles of resource elements, in an orthogonal frequency division multiplexed (OFDM) system, based, at least in part, on one of a ratio of a code block size to a number of bits mapped into each resource element or the number of bits mapped into each resource element, wherein determining the dimensions of the matrix comprises:
    determining a number of rows of the matrix based, at least in part, on the one of the ratio of the code block size to the number of bits modulated in each resource element, or the number of bits modulated in each resource element; and
    determining a number of columns of the matrix based on the number of rows and a total number of bundles of resource elements; and
  performing the de-interleaving of the modulated symbols according to the matrix having the determined dimensions.

15. The method of claim 14, wherein the number of bits mapped into each resource element comprises a sum of modulated bits per layer using different modulation schemes.

16. The method of claim 14, wherein the the code block size is determined using a limited set of possible values for a number of resource elements per code block.

17. The method of claim 16, wherein a first possible value for the number of REs per code block is selected from a lookup table (LUT).

18. The method of claim 17, wherein the LUT supports more than one bundle size of resource elements.

19. The method of claim 17, wherein selecting the first possible value from the LUT comprises:
  determining the number of REs per code block based on at least one of a modulation scheme, layer, or code block size; and
  selecting the first possible value in the LUT corresponding to the determined number of REs per code block.

20. The method of claim 17, wherein the first possible value is selected based, at least in part, on a slot index, symbol index, user equipment (UE) index, or cell ID.

21. The method of claim 14, wherein a type of de-interleaving varies column-by-column in the matrix.

22. The method of claim 21, wherein performing the de-interleaving comprises applying a cyclic shift to alternating columns, corresponding to Orthogonal Frequency Division Multiplexing (OFDM) symbols, in the matrix.

23. The method of claim 21, wherein performing the de-interleaving comprises performing the de-interleaving in a reverse manner for alternating columns, corresponding to Orthogonal Frequency Division Multiplexing (OFDM) symbols, in the matrix.

24. The method of claim 21, wherein a starting point for beginning the de-interleaving for a column in the matrix is based at least in part on a virtual cell identifier (ID), a user equipment (UE) ID, a symbol ID, a hybrid automatic repeat request (HARQ) ID, or a transmission or re-transmission (Tx/Re-Tx) bit.

25. An apparatus for wireless communications in a wireless network via a radio access technology, comprising:
at least one processor configured to:
determine dimensions of a matrix to be used for performing interleaving of modulated symbols carrying bits, from a plurality of code blocks, for mapping into bundles of resource elements, in an orthogonal frequency division multiplexed (OFDM) system, based, at least in part, on one of a ratio of a code block size to a number of bits to be mapped into each resource element or the number of bits to be mapped into each resource element wherein determining the dimensions of the matrix comprises:
determining a number of rows of the matrix based, at least in part, on the one of the ratio of the code block size to the number of bits to be mapped into each resource element, or the number of bits to be mapped into each resource element; and
determining a number of columns of the matrix based on the number of rows and a total number of bundles of resource elements; and
perform the interleaving of the modulated symbols according to the matrix having the determined dimensions;
a memory coupled with the at least one processor; and
a transmitter configured to transmit the interleaved modulated symbols in the wireless network via the radio access technology.

26. An apparatus for wireless communications in a wireless network via a radio access technology, comprising:
a receiver configured to receive modulated symbols in the wireless network via the radio access technology;
at least one processor configured to:
determine dimensions of a matrix used for performing de-interleaving of the modulated symbols carrying bits, from a plurality of code blocks, which are mapped into bundles of resource elements, in an orthogonal frequency division multiplexed (OFDM) system, based, at least in part, on one of a ratio of a code block size to a number of bits mapped into each resource element or the number of bits mapped into each resource element wherein determining the dimensions of the matrix comprises:
determining a number of rows of the matrix based, at least in part, on the one of the ratio of the code block size to the number of bits to be mapped into each resource element, or the number of bits to be mapped into each resource element; and
determining a number of columns of the matrix based on the number of rows and a total number of bundles of resource elements; and
perform the de-interleaving of the modulated symbols according to the matrix having the determined dimensions; and
a memory coupled with the at least one processor.

* * * * *